United States Patent [19]

Hou et al.

[11] Patent Number: 5,325,421
[45] Date of Patent: Jun. 28, 1994

[54] VOICE DIRECTED COMMUNICATIONS SYSTEM PLATFORM

[75] Inventors: Michael M. Hou, Aberdeen; Sharon Kish, Somerset; Sally B. Muir, Bridgewater, all of N.J.

[73] Assignee: AT&T Bell Laboratories, Murray Hill, N.J.

[21] Appl. No.: 935,081

[22] Filed: Aug. 24, 1992

[51] Int. Cl.⁵ .............................................. H04M 3/42
[52] U.S. Cl. ........................................ 379/67; 379/88; 379/355; 379/91; 379/112; 379/127
[58] Field of Search ................. 379/67, 88, 355, 91, 379/112, 127

[56] References Cited

U.S. PATENT DOCUMENTS

| | | | |
|---|---|---|---|
| 4,853,953 | 8/1989 | Fujisaki | 379/88 |
| 4,928,302 | 5/1990 | Kaneuchi | 379/88 |
| 4,945,557 | 7/1990 | Kaneuchi | 379/67 |
| 4,959,855 | 9/1990 | Daudelin | 379/213 |
| 4,979,206 | 12/1990 | Padden et al. | 379/67 |
| 5,054,053 | 10/1991 | Sakanishi | 379/63 |
| 5,091,947 | 2/1992 | Ariyoshi | 381/42 |
| 5,111,501 | 5/1992 | Shimanuki | 379/355 |
| 5,127,043 | 6/1992 | Hunt | 379/88 |

OTHER PUBLICATIONS

"A Voice Password System for Access Security", Atc't Article Journal Sep./Oct. 1986, vol. 65, issue 5.
"Spoken Nickname Recognition Telephone Dialer", IBM Technical Disclosure Bulletin, vol. 31 No. 10 Mar. 1989.
Brochure relating to the Sprint Voicecard Service.

Primary Examiner—Stephen Chin
Assistant Examiner—Michael N. Lau
Attorney, Agent, or Firm—Frederick B. Luludis

[57] ABSTRACT

A facility is provided for allowing a caller to place a telephone call by merely uttering a label identifying a desired called destination and to charge the telephone call to a particular billing account by merely uttering a label identifying that account. Alternatively, the caller may place the call by dialing or uttering the telephone number of the called destination or by entering a speed dial code associated with that telephone number.

18 Claims, 9 Drawing Sheets

FIG. 10

VOICE DIRECTED COMMUNICATIONS SYSTEM PLATFORM

This application is related to copending U.S. patent application Ser. No. 07/935,080 filed concurrently herewith.

TECHNICAL FIELD

The invention relates to automated telephone services employing automatic speech recognition.

BACKGROUND OF THE INVENTION

Telephone credit or calling cards, although convenient, are susceptible to being compromised by potential unauthorized users. Indeed, fraudulent use of such cards has become a serious problem.

To combat such fraudulent use, a telecommunications system may employ automatic speech recognition to verify the identity of a caller who is charging a call to a credit or calling card. Unfortunately, it appears that the use of automatic speech recognition in credit and calling card services end there and does not go beyond such verification. (Hereinafter credit and calling card services will also be referred to as calling card services.)

SUMMARY OF THE INVENTION

We have recognized that automatic speech recognition can be used as the basis of a telecommunications platform which offers a number of enhanced functionalities in addition to the aforementioned verification functionality. Specifically, such enhanced functionalities also provide the subscriber with the option to associate, in accord with an aspect of the invention, different voice labels with different billing accounts. In this way, the subscriber may place a call via the platform and then charge the call to a particular billing account by saying the label, or name, associated with that account. Such enhanced functionalities also include, in accord with an aspect of the invention, a number of different ways of entering a telephone number that a subscriber desires to call. In particular, a subscriber may enter such a telephone number by (a) saying the telephone number or a predefined voice label associated with the number or (b) entering the telephone number or a speed dial code indicative thereof via an associated telephone station set.

Moreover, since verification of a subscriber's identity is based on speech recognition, rather than on a credit or calling card number, the platform allows the subscriber to enter a personal identifier via the associated telephone station keypad, and then verifies the caller's identity by having the caller verbally repeat, in accord with an aspect of the invention, a series of randomly selected numbers.

DETAILED DESCRIPTION

Figure 1:
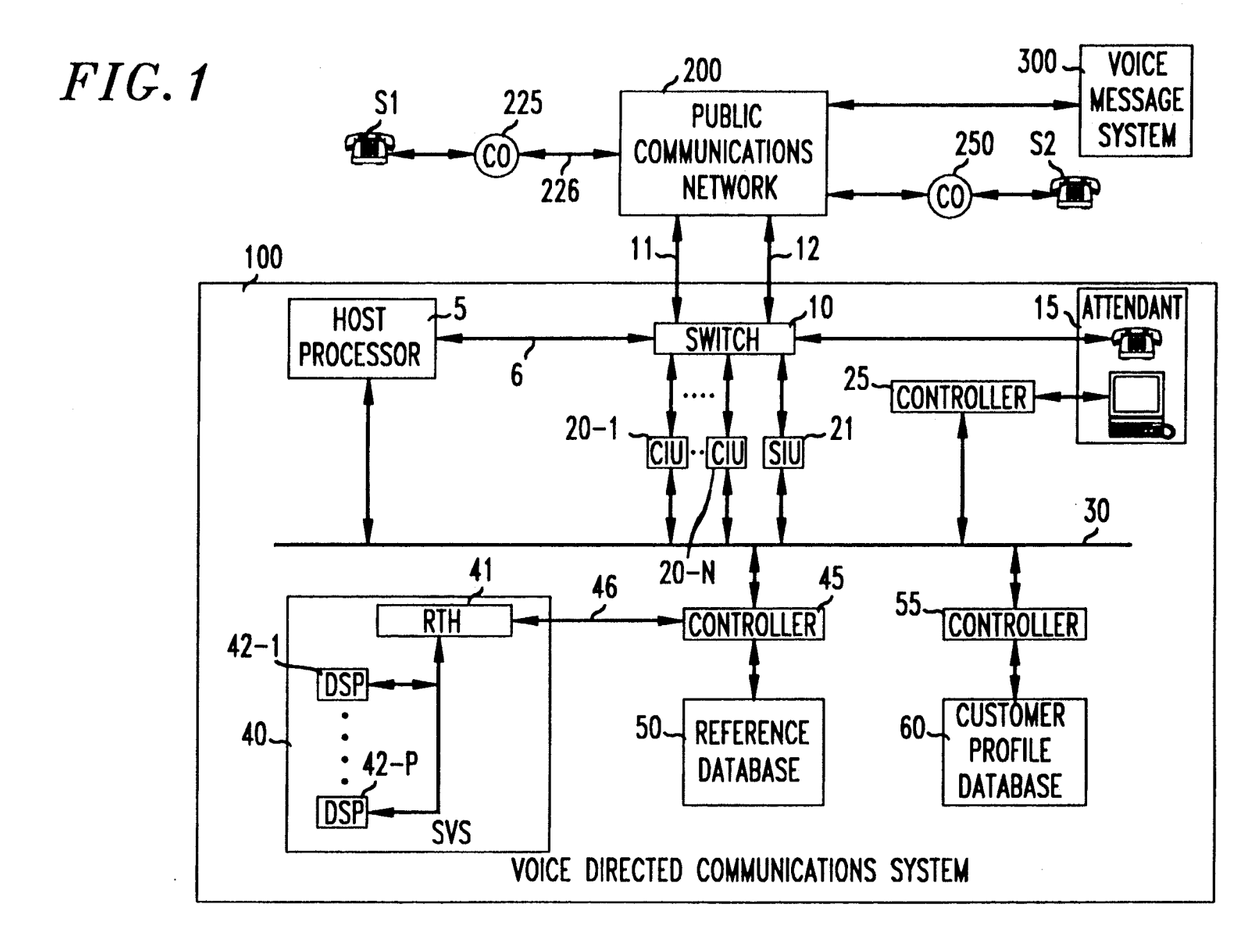
FIG. 1 is a block diagram of a communications system in which the principles of the invention may be practiced.

Voice Directed Communications System (VDCS) 100 shown in FIG. 1 includes a number of functionalities which operate in concert with one another to identify a caller from the caller's speech signals received via communications path 11 or 12. Such identification is based on comparing a model of the received speech signals with a model that was originally constructed at the time that the caller subscribed to the inventive service and that is thereafter updated in the manner discussed below.

In particular, a telephone user, e.g., the user associated with station S1, may subscribe to the services offered by VDCS 100 by dialing a predetermined subscription telephone number, e.g., 1-800-826-5555. When the user dials the last digit forming that number, then Central Office, CO, 225 associates the dialed number with public communications network 200 and extends the call thereto via path 226. In doing so, CO 225 sends the dialed (cared) telephone number as well as the calling telephone number to network 200. Network 200, which may be, for example, the AT&T public switched network, extends the call connection, in a conventional manner, to a network 200 destination switch (not shown) that connects to VDCS 100. The network 200 destination switch, in turn, extends the call via a selected one of trunks 11 and 12 connecting to switch 10 of VDCS 100. The destination switch then supplies the calling and called telephone numbers to switch 10 via the selected trunk.

Switch 10, in response to the incoming call, sends a message containing, inter alia, the calling and called telephone numbers and identity of the selected trunk to host processor 5 via bus 6. In an illustrative embodiment of the invention, host processor 5 and switch 10 may be, for example, the StarServer FT processor available from AT&T and the model SDS1000 switch available from Summa Four, respectively.

Figure 2:
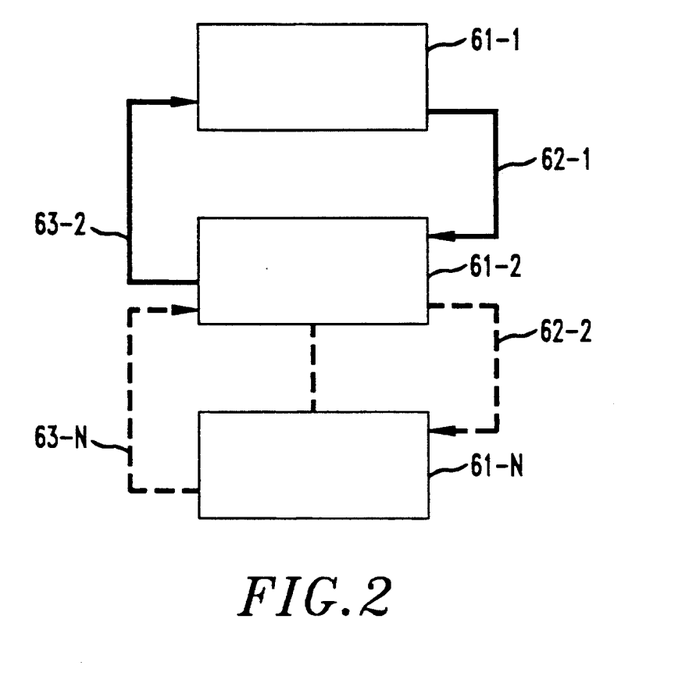
FIG. 2 is an illustrative example of linking particular subscriber records to one another.

Host processor 5, responsive to the switch 10 message containing the associated subscription telephone number, directs switch 10 via bus 6 to establish a connection between the incoming call connection and one of a plurality of attendant (operator) positions 15, one of which is shown in FIG 2. At that point, the attendant 15 may communicate with the station S1 caller to acquire information relating to the billing and processing of calls that the new subscriber will subsequently place via system 100. Such information may include, for example, the caller's name, address, billing account, etc. As a result of such communication, the caller is assigned an account code comprising a predetermined number of digits, some of which, e.g., the first seven digits, may be selected by the caller. The remaining digits of the account code are selected by system 100 and are used as so-called "check" digits.

In accord with an aspect of the invention, the new subscriber's account code may be a code that has already been assigned to another subscriber. If that is the case, then host 5 causes that fact to be displayed on terminal 15. That is, terminal 15 displays on its display the service profile, or record, associated with a particular one of the other subscribers that will be sharing the same account code with the station S1 subscriber. At that point, the attendant may change the latter service record so that it (a) indicates that the associated account code is being shared with the new subscriber, (b) points to the new subscriber's service record and (c) contains the new subscriber's identity. The new subscriber's record is similarly arranged so that it points to the latter service record. An illustrative example of such linking is shown in FIG. 2. Briefly, a chain of service records are linked to one another by storing in each such record the address of the next record in the chain and the address of the previous record in the chain. Each of the records 61-2 through 61-N thus contains the address, e.g., pointer 62-2, of the next record in the chain and, except for head record 61-1, the address, e.g., pointer 63-2, of the previous record in the chain. The way in which system 100 identifies a caller that is sharing an account code with one or more other subscribers is discussed below.

As a further result of such communication, the new subscriber may define a number of voice-identified calling labels and associate the labels with respective telephone numbers. For example, the subscriber may associate the label (a) "call home" with the subscriber's home telephone number, (b) "call office" with the subscriber's work or office telephone number, (c) "call Dad" with the subscriber's father's telephone number, etc. Thereafter, and as will be explained below, when the subscriber places a call to system 100 for the purpose of placing a call to a particular location, e.g., "home", then all that the subscriber needs to do in response to a particular system 100 request is to say "call home". System 100, in response thereto, associates the spoken identifier "call home" with the subscriber's home telephone number and then places an outgoing telephone call thereto via switch 10 and network 200. System 100 then causes switch 10 to interconnect the outgoing call with the subscriber's incoming call.

The new subscriber may also associate particular telephone numbers, in accord with an aspect of the invention, with respective billing accounts. For example, the subscriber may specify that all telephone calls that the subscriber places to his/her office via system 100 are to be billed to a particular billing account, for example, a credit card account. As another example, the subscriber may specify that all telephone calls that the subscriber places to a business associate via system 100 are to be billed to another account, e.g., a business telephone number. The new subscriber may also specify a default billing account for all other calls that the subscriber places via system 100, in which the default billing account may be the subscriber's system 100 service number or home telephone number.

In accord with an aspect of the invention, the subscriber may also specify voice-identified billing labels which may or may not be tied to a particular telephone number(s), but which the subscriber may use to override default or predefined billing. Specifically, such a billing label may be, for example, the name of a credit card service, such as VISA; a calling card service, such as AT&T; or a particular telephone number. For example, assume that the subscriber has tied billing of office calls to an AT&T calling card number and has specified VISA as a billing label. Thereafter, the subscriber may place a telephone call to his/her office and, if desired, override the predefined AT&T calling card billing for the call by saying "bill VISA" following the entering of the subscriber's office telephone number. More particularly, if the subscriber has specified a calling label for the office telephone number, then the subscriber may initiate a call to his office telephone by saying "call office". The subscriber then pauses for a predetermined duration, e.g., at least one second, to disassociate the calling label from the billing label. At the end of one second, the subscriber may then say "bill VISA" to override the predefined billing for the office call.

System 100, in response thereto, (a) translates the identifier "call office" into the subscriber's office telephone number, (b) places an outbound call to that number via switch 10 and network 200, and (c) connects the subscriber's call to the outbound call. Similarly, as a result of the pause, system 100 associates the identifier "bill VISA" with a billing function and overrides the predefined, or default billing priorly specified for the call. Accordingly, system 100 bills the call to the subscriber's VISA account.

In accord with an aspect of the invention, the aforementioned pause may be eliminated in all but a few cases by employing speaker independent "word spotting" for the words "call", (or "dial") and "bill", (or "charge"). Accordingly, when system 100 spots the spoken word "call" ("dial") it classifies that word and the following speech signals as a calling label. If system 100 then spots the spoken word "bill" ("charge") it classifies that word and the following speech signals as an overriding billing label, as will be discussed below.

In accord with another aspect of the invention, the new subscriber may associate a particular speed dialing code with a telephone number. In an illustrative embodiment of the invention, a speed dialing code is terminated by a predetermined suffix, e.g., the pound sign (#). For example, the new subscriber may specify 1# and 2# as the speed dialing codes for respective telephone numbers, e.g., 1-800-555-1212 and 1-908-555-1212, respectively.

When the attendant has collected and entered the subscriber's subscription information, including the aforementioned labels (if any) in terminal 15, (FIG. 1) the attendant then supplies the entered information to controller 25 for delivery to controller 55 via Local Area Network (LAN) 30. In an illustrative embodiment of the invention, LAN 30 may be, for example, the well-known Ethernet network.

Controller 25, more particularly, forms the subscription information into a message addressed to controller 55 and transmits the message over LAN 30. Controller 55, in turn, removes the message from LAN 30 and forms the contents thereof into a subscription profile (or record) associated with the new subscriber and stores the profile in customer profile database 60 in the manner discussed below. (It is noted that if the new subscriber's account code is a shared code, then controller 55 effectively "links" the new subscriber's profile record to the profile record associated with the subscriber that is sharing the account code with the new subscriber in the invention discussed above.)

At this point in the subscription process, the new subscriber's account code, various labels, associated telephone numbers, speed dial codes, etc., are stored in database 60 as ASCII text.

As a last step in the subscription process, the attendant instructs the new subscriber how to register particular speech utterances characterizing the subscriber's account code, as well as the aforementioned labels, so that the registration may be used thereafter to verify the subscriber's identity and verbal requests. To that end, the attendant sends to host 5, via terminal 15 and LAN 30, a request to invoke a voice registration session, in which the request contains the subscriber's account code and labels. Host 5, in response thereto, causes switch 10 to bridge Subscription Identification Unit (SIU) 21 onto the switch 10 connection between the subscriber's incoming call connection and attendant terminal 15. In addition, host 5 supplies via LAN 30 the new subscriber's account code and labels to SIU 21.

SIU 21, in particular, includes, inter alia, a number of digital signal processors which operate to perform a number of different voice processing functions including, inter alia, automatic speech recognition, text-to-speech processing for generating voice prompts and verbal facsimiles of the subscriber's labels. The automatic speech recognition function, more particularly, performs connected digit recognition and models the subscriber's utterance of the associated account code as end-pointed autocorrelation coefficients using techniques that are well-known in the voice recognition art. For the first phase of the registration process, SIU 21 constructs a basis for automatically verifying the new subscriber's utterance of his/her account code and other strings of digits. In doing so, SIU 21 prompts the new subscriber to say, in accord with an aspect of the invention, a predetermined number of different strings of digits (e.g., eleven strings) that are announced one string at a time, in which each string comprises a predetermined number of digits, e.g., five digits. For example, SIU 21 prompts the new subscriber to say the digit string of 0,1,0,1,2. When the subscriber responds, SIU 21 collects the subscriber's utterances and segments the utterances into speech signals characterizing respective digits of the transmitted string. SIU 21 then segments the speech signals into respective digits and then models the resulting digits as end-pointed autocorrelation coefficients. SIU 21 then passes the resulting coefficients, the ASCII representation of the corresponding digit string and the subscriber's account code to controller 45 for further signal processing, as will be explained below. SIU 21 then repeats the foregoing for each of the remaining ten strings of digits.

The next phase of the registration procedure registers the subscribers labels. For example, assume that the subscriber specified (a) "call home" and "call office" as calling labels and (b) "bill Visa" as an overriding billing label. SIU 21 registers the new subscriber's voice representation of those labels by passing the ASCII equivalent (text version) of the first calling label ("call home") through a text-to-speech processor and transmitting the result to the subscriber along with a request to verbally repeat the label. Responsive to the subscriber's utterance of that lab, SIU 21 segments the subscriber's speech signals into a series of subword unit phonemes characterizing the internal label and associates each such subword unit phoneme with a particular index value, thereby forming a series of indices, or numbers. Thus, a particular utterance of a label is modeled as a series of indices and stored in memory. Thereafter, the particular utterance may be interpreted by generating such a series of subword indices for the utterance, and comparing the generated series with each priorly stored series of indices characterizing respective labels. The stored series that compares with the generated series will then point to the telephone number, or billing account, identified by the utterance. SIU 21 then passes the resulting ASCII indices, the corresponding ASCII representation of the voice label and subscriber's account code to controller 45 via LAN 30. SIU 21 then repeats the foregoing process for each of the subscriber's other labels.

At this point, SIU 21 has essentially completed its part in the registration process. However, before returning control of the subscriber's telephone call to attendant 15, SIU 21 waits for a confirmation message from controller 45 indicating that voice verification models of the subscriber's speech utterances have been stored in database 50.

Controller 45, more particularly, upon receipt of the ASCII representation of the last string of digits and resulting characterizing coefficients, passes those coefficients and their respective digit strings to SVS (Speech Verification System) 40. SVS 40, which may be, for example, the DSP 30 system available from AT&T, includes Real Time Host (RTH) controller 41 and a plurality of DSPs (Digital Signal Processors) 42-1 through 42-P. Illustratively, P=128. RTH 41 serves as an interface between DSPs 42-1 through 42-P and an external processor, such as controller 45, such that, upon receipt of a speech processing request, RTH 41 determines which one of the DSPs 42-1 through 4-P is available (idle) and passes the request thereto along with the accompanying data. Assuming that DSP 42-1 is idle, then RTH 41 passes the eleven digit strings and corresponding end-pointed autocorrelation coefficients to DSP 42-1 for processing. DSP 42-1, in a conventional manner, generates a so-called Hidden Markov Model (HMM) characterizing the subscriber's utterance of the digit zero, in which the HMM is generated as a function of the associated end-pointed autocorrelation coefficients characterizing the digit zero for each occurrence of that digit in the eleven strings of digits. Similarly, DSP 42-1 generates an HMM characterizing each of the other digits, i.e., digits 1 through 9. In accord with an aspect of the invention, DSP 42-1 also generates an HMM characterizing the subscriber's utterance of the digit zero as "oh", if present.

When DSP 42-1 completes its task, then RTH 41 passes the results to controller 45. Controller 45 then stores the HMMs in a reference database 50 memory record that is indirectly indexed by the subscriber's account code. (It is noted that if that code is shared with another account, then controller 45 effectively "appends" the new subscriber's database 50 record to the record associated with the subscriber who is sharing the account code with the new subscriber. Similarly, controller 45 notes that fact in the latter record as discussed above.) Following the foregoing, controller 45 stores the ASCII subword unit of indices, characterizing the new subscriber's utterance of the subscriber's labels, as well as the ASCII equivalents thereof in the aforementioned database 50 memory record. Controller 45 then notifies SIU 21 via LAN 30 that processing of the subscriber's data has been completed. SIU 21, in turn, sends a similar message to host processor 5, which causes host 5 to disconnect SIU 21 from the subscriber's incoming call. At that point, the attendant 15 notifies the subscriber that registration has been completed.

Thereafter, the subscriber may "dial up" system 100, say his/her subscriber number and then invoke a calling function characterized by one of the subscriber's predefined labels, such as "call home". Alternatively, the subscriber may request that a call be placed to a location that is not defined by one of the subscriber's predefined labels. That is, the subscriber may say the telephone number of a location that the subscriber desires to call. For example, the subscriber may say "908-555-6008" identifying, for example, station S2. System 100, in response thereto, decodes the subscriber's utterance of 908-555-6008 and places an outgoing call to that location and then connects the subscriber's incoming call to that outgoing call.

Specifically, the subscriber may dial the system 100 service telephone number, e.g.; 1-800-838-5555, to establish a telephone connection between station S1 and system 100 via CO 225 and network 200. The system 200 destination switch, responsive to receipt of the call and called telephone number, associates that number with a particular one of its outgoing trunk groups and presents the call to system 100 via an idle trunk (port) of that group. Switch 10, responsive to receipt of the incoming call, notifies host 5 of that fact via LAN 30. Host 5, in response to such notification, directs switch 10 via LAN 30 to establish a connection between the incoming call and an idle one of the CIUs (Caller Identification Units) 20-1 through 20-N, e.g., CIU 20-1. CIUs 20-1 through 20-N are identical to SIU 21, except that the CIUs are not programmed to present the registration process to a new subscriber.

Assuming that CIU 20-1 is connected to the subscriber's call, then that CIU transmits over the connection an announcement asking the subscriber "what is your account code?". In accord with an aspect of the invention, the subscriber has the option of entering his/her account code (number) by saying it or by keying it in using the station S1 keypad. If the subscriber elects the latter option and keys in his/her account code, then, CIU 20-1 collects the "keyed in" digits. Upon receipt of the last such digit, CIU 20-1 then verifies the subscriber's identity, in accord with an aspect of the invention, by generating and transmitting over the incoming call connection a series of randomly selected digits and then prompting the subscriber to say the series of digits.

If the subscriber says his/her account code, then, similarly, CIU 20-1 collects the subscriber's utterances and uses connected digit processing to segment the utterances into speech signals characterizing respective digits of the account code. CIU 20-1 then models each such speech segment into end-pointed autocorrelation coefficients and then identifies the account code, but not the caller, based on those coefficients. CIU 20-1 then stores the account code in its local memory. (If the subscriber entered the account code via the station S1 keypad, then CIU 20-1 decodes the resulting series of tones (i.e., Dual Tone MultiFrequency signals, i.e., DTMF signals) into respective digit values and stores them as the account code. Then, as mentioned above, CIU 20-1 transmits the series of random digits and requests that the subscriber repeat those digits. Similarly, CIU 20-1 segments and models the caller's response into End-Pointed Autocorrelation (hereinafter "EPA") coefficients.)

Following the foregoing, CIU 20-1 sends a message containing the received account code and the EPA coefficients modeling the caller's (subscriber's) spoken account code (or random digits, as the case may be) to controller 45 in order to verify the caller's identity. Controller 45, in response thereto and using the received account code as a memory index, unloads from reference database, or memory 50, the record containing the Hidden Markov Models (HMM) of the subscriber's utterances of the respective digits forming the associated account code. Controller 45 then sends via bus 46 the unloaded HMMs and EPA coefficients generated by CIU 20-1 to RTH 41 for the purpose of verifying that the HMMs and EPA coefficients represent speech signals spoken by the same person. (It is noted that if the EPA coefficients represent random digits, then controller 45 sends only the HMMs priorly stored for those digits.)

RTH 41, in response to receipt of the request, identifies an idle one of its associated DSPs 41-1 through 42-P, e.g., DSP 42-P, and supplies the HMMs and EPA coefficients received from controller 45 to DSP 42-P. DSP 42-P, in turn, generates HMM speech models for respective ones of the received digit EPA coefficients. DSP 42-P then compares the HMMs that it generated with their corresponding priorly stored HMMs received from controller 45 via RTH 41. If DSP 42-P finds that based on a predetermined level of certainty, e.g., a probability of 75%, the generated HMMs compare with their corresponding priorly stored HMMS, then DSP 42-P makes note of that fact and updates the priorly stored HMMS. That is, DSP 42-P averages the generated HMMs with their corresponding priorly stored HMMs. DSP 42-P then supplies the updated HMMs and a flag indicating that the verification is true (i.e., positive) to RTH 41. RTH 41, in turn, supplies that information and the subscriber's account code to controller 45. (If the comparison was not within the predetermined level of certainty, then the aforementioned flag indicates that the verification is false (i.e., negative). In that case, DSP 42-N does not update the priorly stored HMMs.)

Controller 45, in response to the flag being positive, stores the updated HMMs in the subscriber's database 50 record. Controller 45 then sends the flag and default billing number to CIU 20-1. If the flag indicates a negative verification, then controller 45 returns a reply message indicating that fact to CIU 20-1 via LAN 30. CIU 20-1 may then terminate the call in response to that reply message or direct the call to attendant 15.

If controller 45 finds that the account code, or identifier, that it receives from CIU 20-1 is associated with a number of subscriber records, then controller 45 unloads the pertinent HMMs from each of those linked records and passes the various sets of unloaded HMMs and their respective record addresses as well as the received EPA coefficients to RTH 41 for processing. RTH 41, in turn, distributes the received sets of HMMs and a copy of the EPA coefficients to respective idle ones of its associated DSPs 41-1 through 41-P. Each such DSP, e.g., DSP 41-1, in response thereto, generates and supplies to RTH 41 a score indicative of the level of certainty that such EPA coefficients compare with the set of HMMs that it receives from RTH 41. RTH 41, in turn, selects the highest score from the various scores that it receives from its associated DSPs. If RTH 41 finds that the value of the highest score is within the aforementioned predetermined level of certainty, then RTH 41 confirms caller's identity and associates the caller with the subscriber record whose address is associated with the highest score. RTH 41 then causes the HMMs associated with that address to be updated in the manner discussed above and then supplies the updated HMMS, the associated score and record address as well as the aforementioned positive flag to controller 45. Controller 45, in response thereto, returns the aforementioned reply message to CIU 20-1 and includes therein the subscriber record associated with the aforementioned highest score. If, on the other hand, RTH 41 finds that the value of the highes score is not within the predetermined level of certainty, then RTH 41 notifies controller 45 of that fact. Similarly, controller 45 returns a message indicative of that fact to CIU 20-1, as discussed above.

Assuming that the controller 45 reply message is positive, then CIU 20-1 transmits over the call connection an announcement requesting e.g., "what number do you wish call?". In accord with an aspect of the invention, the subscriber may respond to that request by (a) using the station S1 keypad to "key in" a particular telephone number that the subscriber desires to call, e.g., 908-555-1234; (b) keying in one of the subscriber's predefined speed dialing codes, e.g., 231#, (c) saying the particular telephone number that the subscriber desires to call; or (d) saying one of the subscriber's predefined calling labels, e.g., "call home" or "call office", In particular, CIU 20-1, responsive to receipt of DTMF signals characterizing a telephone number decodes those signals into respective digits in the order that the signals are received via switch 10 and network 200. Upon the decoding of the last of such telephone digits, CIU 20-1 sends a message containing the subscriber's account code and the received telephone number to host computer 5. Host computer 5 then generates and stores in its internal memory a billing record containing, inter alia, (a) the subscriber's service number and billing telephone number (e.g, home telephone number), (b) the telephone number that is being called and (c) current date and time. Host 5 then directs switch 10 to place an outbound telephone call via network 200 and outpulse the called telephone number. Host 5 also directs switch 10 to connect the subscriber's incoming call to the outbound call. As an aspect of the invention, CIU 20-1 remains bridged onto the subscriber's incoming call as a means of detecting the subscriber's possible request for a telephone operator. That is, each of the CIUs 20-1 through 20-N using the well-known functionality of independent speech recognition may spot a caller saying "operator". Accordingly, if CIU 20-1 "spots" the subscribers saying the word "operator" during the processing of an associated call, then CIU 20-1 sends a message to that effect to host 5 via LAN 30. Host 5, in turn, connects the subscriber to an available attendant position 15 via switch 10. However, a CIU does not respond to the word "operator" once an associated call has been completed. At that point, the subscriber may enter particular signals, e.g., the pound (#) sign, as a way of requesting the assistance of an operator. That is, if switch 10 detects those particular signals after the call has been completed, then switch 10 sends the operator request message to host 5. Alteratively, the subscriber, at any point during the current call, may enter particular signals, e.g., **9, as a way of entering a request to place another call. Thus, if switch 10 detects the entry of those signals, then it passes a message indicative thereof to Host 5. Host 5, in turn, terminates the outbound switch 10 connection and then asks the caller to enter a calling destination.

If, on the other hand, the subscriber keys in one of the subscriber's speed dialing codes, e.g., 231#, then CIU 20-1 upon the receipt and decoding of the signals characterizing that code sends a message to controller 45 requesting the telephone number associated with the speed dialing code entered by the subscriber. Controller 45, upon receipt of the message, interrogates the subscriber's profile record stored in database 50 to obtain the requested telephone number. Controller 45, in turn, unloads the telephone number from database 50 and sends the number, the associated speed dialing code and subscriber's account code number to CIU 20-1 via LAN 30. CIU 20-1, in turn, sends a call request message containing that telephone number, as well as a request to establish a telephone connection thereto, to host 5. Host 5, in turn, establishes a billing record and then places a telephone call to the desired telephone number via switch 10 and network 200.

Alternatively, the subscriber may say the desired telephone number, e.g., 908-555-1234. If the subscriber does so, then CIU 20-1, using connected digit segmentation, segments the subscriber's speech signals characterizing the digits of that telephone number and then models such speech segments into the aforementioned endpointed autocorrelated coefficients, as mentioned above. Based on those coefficients, CIU 20-1 is able to interpret (identify) the digits spoken by the subscriber. Such interpretation is commonly referred to as speaker-independent, automatic speech recognition. Accordingly, as a result of such interpretation, CIU 20-1 identifies the digits forming the spoken telephone number. Similarly, CIU 20-1 then packages those digits into a call request message and sends the message to host 5 via LAN 30. Host 5, in response to receipt of that message, establishes an associated billing record and places a telephone call to the received telephone number, as discussed above. As another alterative, the subscriber may say a calling label, e.g., "call office" previously defined by the subscriber. CIU 20-1 responsive thereto generates the aforementioned subword unit indices from the subscriber's speech signals characterizing that label. Then, as mentioned above, CIU 20-1 compares the generated series of indices with the subword unit indices of the subscriber's labels priorly stored in database 50 as discussed above.

Accordingly, if CIU 20-1 identifies the telephone number associated with the spoken label, then CIU 20-1 forms a call request message containing, inter alia, the identified telephone number and sends the message to host 5. Host 5, in turn, places the requested telephone call in the manner discussed above. In accordance with an aspect of the invention, each CIU 20-1 through 20-N is arranged to detect a particular keyword, e.g., the word "cancel", which a subscriber may utter to cancel a telephone number that the subscriber is entering. For example, if the subscriber says the word "cancel" after having entered a number of digits of a telephone number, then the CIU serving the call, e.g., CIU 20-1, in response to detecting that utterance (using speaker independent speech recognition to spot that word as discussed above) discards the received digits and retransmits the aforementioned announcement.

It can be appreciated that SVS 40 expends an appreciable amount of processing time processing the subscriber's spoken account code. To speed up that processing so that a reply may be retuned to controller 45 as soon as possible, RTH 41 may be arranged so that it divides the digits forming the account code among a number of idle DSPs 42-1 through 42-P. For example, RTH 41 could supply the spoken digits to respective idle DSPs 42-1 through 42-P as well as the associated HMMs stored in database 50. Accordingly, if nine such DSPs are idle, then each of those DSPs would process one digit of the account code.

Figure 3:
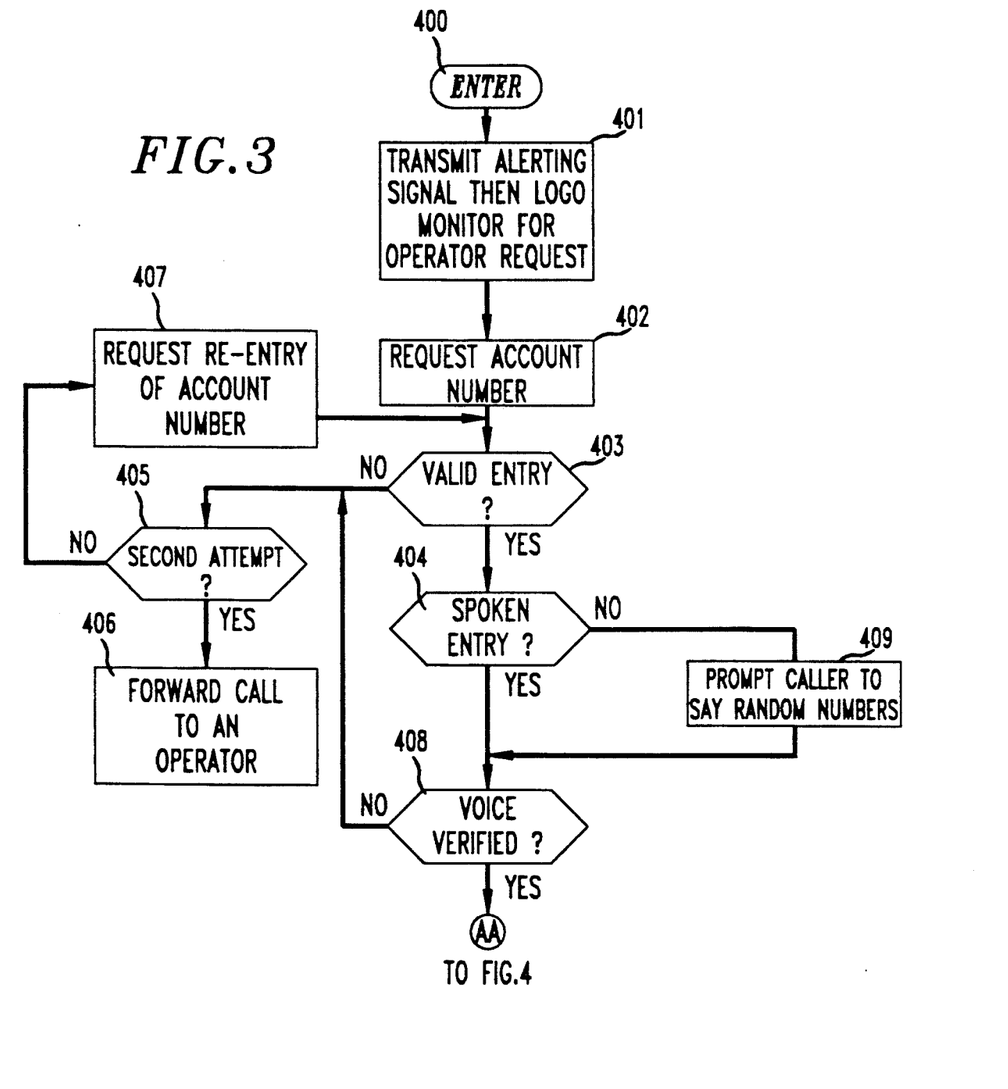
FIGS. 3-5 is a flow chart of a program which implements the invention in the system of FIG. 1.
Figure 4:
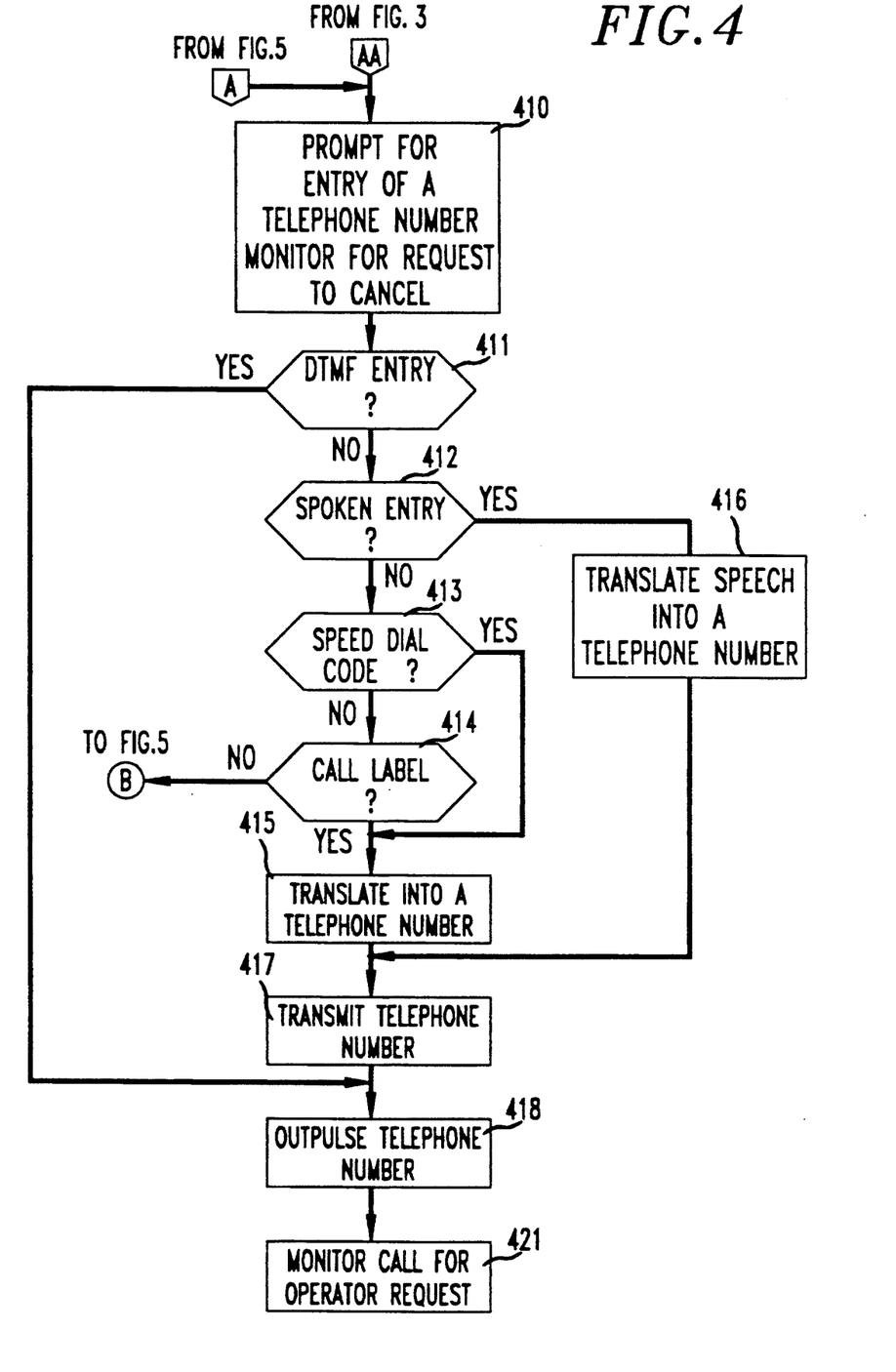
Figure 5:
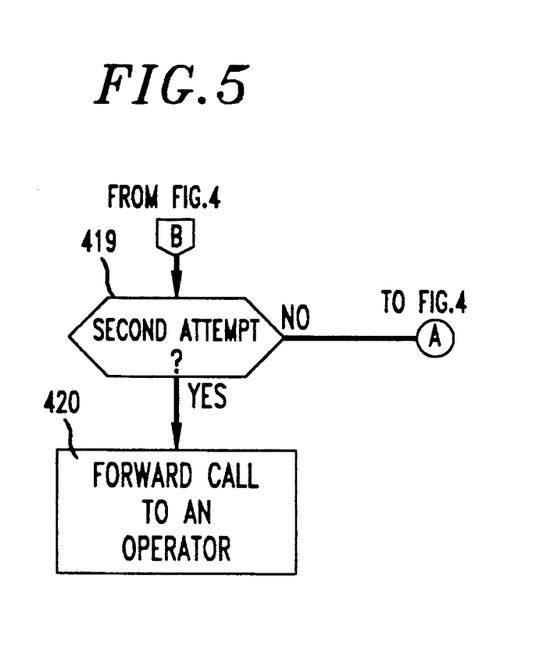
Figure 6:
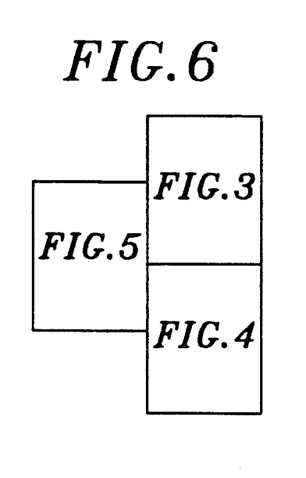
FIG. 6 shows the manner in which FIGS. 3-5 should be arranged with respect to one another.

Turning now to FIGS. 3–5, there is shown in flow chart form the program which implements the invention in system 100. Specifically, the program is entered at block 400 in response to a new call received via switch 10. At block 400, the program proceeds to block 401 where it transmits a brief service-alerting signal, e.g., a tone, and then transmits a service name announcement, e.g., "Voice Direct". At that point, the program begins to monitor the call for receipt of the word "operator" or the word "cancel" and proceeds in the manner discussed above if it happens to receive either word. The program then proceeds to block 402 where it prompts the caller to enter his/her account code (identifier). The caller, in response to the prompt, may either say the digits forming his/her account or enter the digits via the touch-tone keypad of the caller's telephone station set. At block 403, the program determines if a customer record associated with the entered account number is stored in database 50 (FIG. 1). If the determination turns out to be true, then the program proceeds to block 404. Otherwise, the program proceeds to block 405.

At block 405, the program checks to see if the caller's second attempt to enter a valid account code also failed and forwards the call to an operator via block 406 if that is the case. Otherwise, the program proceeds to block 407 where it again prompts the caller to enter his/her account code.

At block 404, the program checks to see if the entered account code is characterized by speech signals (i.e., the caller spoke the numbers) and proceeds to block 408 if that is case. Otherwise, the program proceeds to block 409 where it prompts the caller to repeat (say) a series of random numbers. The program collects the caller's response thereto and proceeds to block 408. At block 408, the program verifies the caller's speech in the manner discussed above. If the caller's speech cannot be verified, then the program proceeds to 407. Otherwise, the program proceeds to block 410 where it prompts the caller to enter a called destination. As mentioned above, a caller may place a call by (a) saying a telephone number or call label or (b) entering the telephone number or speed dial code via the keypad of the caller's station set, e.g., station S1. The program then waits for an entry and proceeds to block 411 upon receipt thereof. At block 411, the program proceeds to block 418 if it finds that the caller entered a telephone number using the station set keypad (i.e., the number is characterized by respective DTMF tones). If that is not the case, then the program proceeds to block 412 to determine if the caller spoke the telephone number. If the latter determination turns out to be true, then the program proceeds to block 416 where it causes the associated CIU to translate the caller's speech signals into a telephone number (as discussed above) and then proceeds to block 417. If the determination at block 412 turns out to be false, then the program proceeds to block 413 to determine if the caller entered a speed dial code. If the program finds that the caller did not enter a speed dial code, then it proceeds to block 414 to determine if the caller entered a spoken call label. If the program finds that the caller entered either a speed dial code or a call label, then the program proceeds to block 415 where it causes SVS 40 to translate the caller's entry into a telephone number, as discussed above. The program then proceeds to block 417 where it transmits the resulting telephone number to the caller and then proceeds to block 418 where it causes the telephone number to be outpulsed to network 200.

If the program at block 414 finds that the caller did not enter a call label, then the program proceeds to block 419 where it determines if the caller's latest entry represents a second attempt to obtain a valid entry from the caller. If that is the case, then the program forwards the call to an operator. Otherwise, the program proceeds to block 410 to again prompt for the entry of a telephone number.

At block 418, the program places via system 100 an outgoing call and then directs system 100 to connect the incoming call to the outgoing call connection. The program then proceeds to block 421 where it continues to monitor the call for receipt of a request for an operator or request to place another call. In an illustrative embodiment of the invention, the subscriber may enter such a request at any point in the processing of the call, i.e., between blocks 402 and 417, by saying the word "operator" or entering particular signals characterizing, for example, 0#, after the call has been completed, i.e, blocks 418 and 421. Similarly, the subscriber may enter **9 to enter a request to place another call.

During the recent past, a large number of telephone subscribers have subscribed to a voice messaging service, such as voice message system 300 shown in FIG. 1. In a nutshell, the functionality provided by system 300 is similar to that provided by a conventional answering machine. That is, if a system 300 subscriber, e.g., the subscriber associated with station S1, does not answer a telephone call, for whatever reason, then the calling party is invited to leave a voice message with system 300. However, unless the called subscriber places a call to system 300, he/she does not know that the calling party left a voice message with system 300. A number of voice messaging systems address that situation by causing a lamp on the subscriber's station set to be lit as a way of indicating that the subscriber has one or more voice messages waiting. System 100 takes a different approach.

In particular, if the new subscriber is associated with a voice messaging service, e.g., system 300, then, during the subscription and registration process, attendant 15 inserts in the subscriber's database 60 record and database 50 record (a) a flag indicating that the new subscriber is associated with a voice messaging service, (b) the telephone number of that service and (c) the subscriber's messaging service account code or password. Thereafter, when the new subscriber places a call to system 100 for the purpose of, e.g., placing an outgoing call, then, while an associated CIU, e.g., CIU 20-1, is processing the subscriber's call request, host 5 places via switch 10 and network 200 a call to voice messaging service 300. When that system answers the call, host 5 transmits the subscriber's telephone number, pauses for a predetermined period of time and then transmits the associated account code (password). System 300, in response to that information, transmits the status of voice messages that are stored in system 300 for the subscriber, in which such status could vary from no voice messages to a number of voice messages. In addition, host 5, after transmitting the account code, causes switch 10 to bridge the subscriber's incoming call to the telephone connection established between switch 10 and system 300 via network 200. Thus, in accord with an aspect of the invention, the subscriber is automatically presented with the status of his/her system 300 voice messages.

Figure 7:
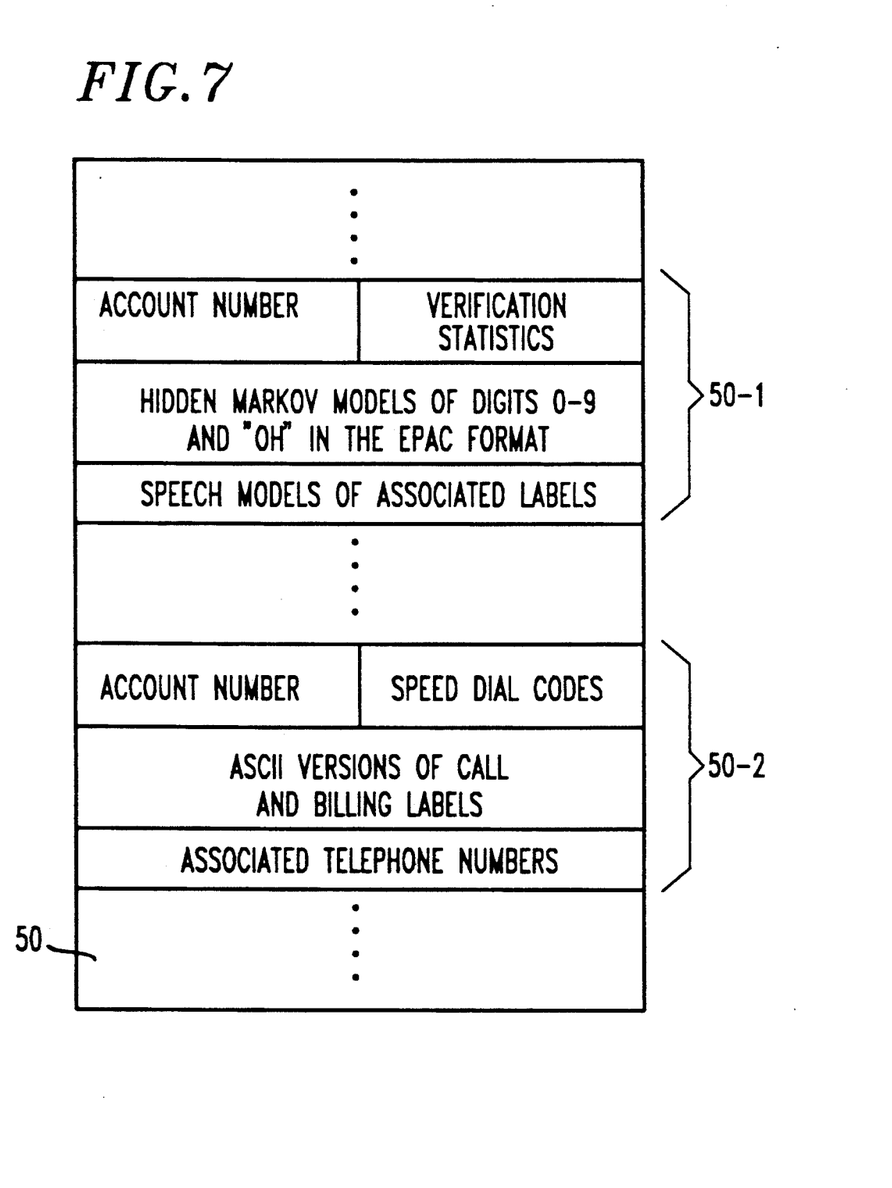
FIG. 7 is a layout of a subscriber record that is stored in the reference database of FIG. 1.

Turning now to FIG. 7, there is shown an illustrative layout of reference database 50. In particular, database 50 includes a pair of records, e.g., 50-1 and 50-2, for each system 100 subscriber. One record of the pair, e.g., record 50-1, contains the Hidden Markov models of the subscriber's speech signals characterizing the digits zero through nine (and possibly "oh"), call labels and associated billing labels. The record also contains various statistics relating to verifying the identity of a calling subscriber from his/her speech signals. For example, such statistics may be used to update associated voice templates and include the number of times system 100 performed such verification, number of times that such verification failed, and various threshold values relating to such verification and recognition of digits and labels spoken by the associated subscriber. The other record of the pair, e.g., record 50-2, contains the ASCII (text) versions of the information contained in record 50-1, as well as associated telephone numbers and speed dialing codes. It is seen from this FIG. that each such record of the pairs includes a field for the associated account code. The account code field also includes sub-fields (not shown) which are populated if the account code is shared with one or more subscribers. That is, the contents of the sub-fields link the associated record to the other records as discussed above.

Figure 8:
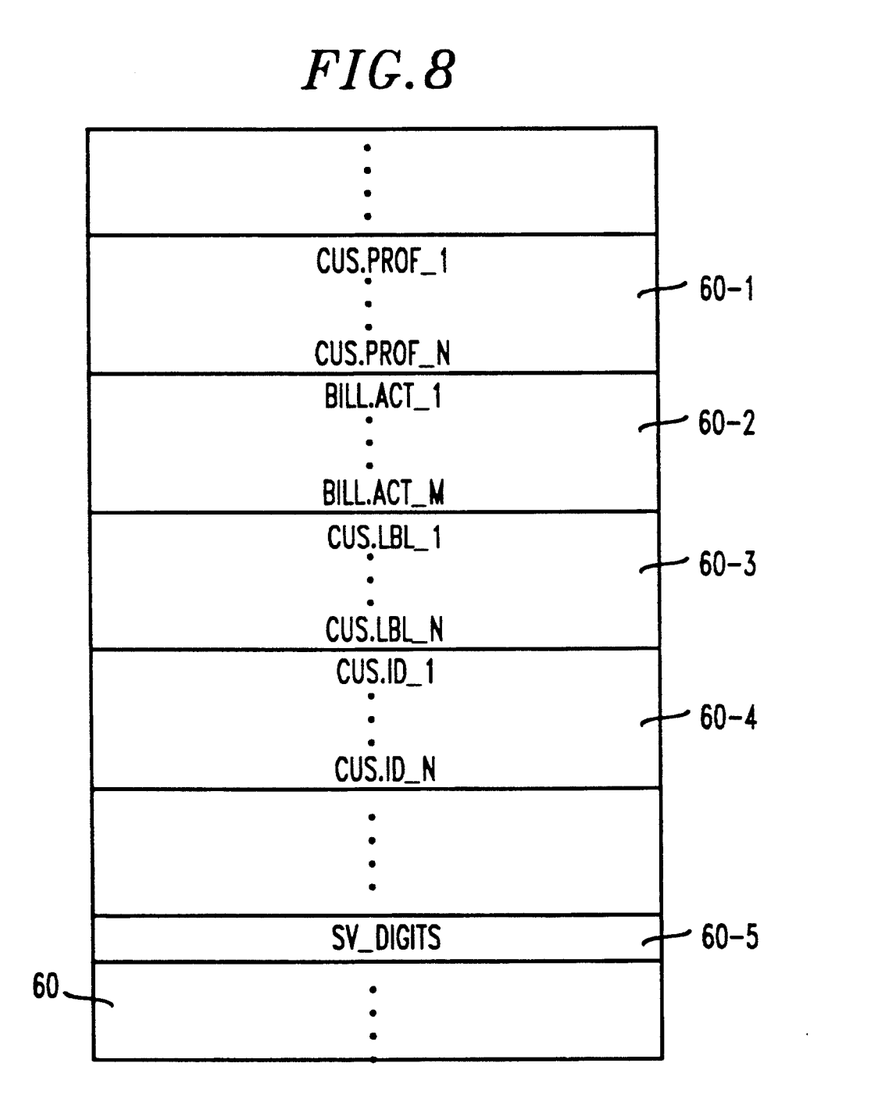
FIG. 8 shows the layout of the customer profile database of FIG. 1.

The layout of database 60 is somewhat different, as shown in FIG. 8. As mentioned above, database 60 is used for the storage of customer subscription information, in which such information is stored across a number of database, 60 tables. One such table, table 60-1, is formed from a plurality of customer-profile records (CUS.PROF_1 through CUS.PROF_N) each containing information specific to a respective subscriber. Such specific information includes, for example, the subscriber's name and address, account number, credit limit, default billing account number, billing address and a number of database 60 addresses (pointers) which point to entries in other tables, such as table 60-4. (The account number field also includes a number of sub-fields to link the associated with other records if the associated account code happens to be shared with other subscribers.) Table 60-4 is also formed from a plurality of customer-identity records (CUS.ID_1 through CUS.ID_N) each containing information personal to a respective subscriber which is used by attendant 15 to verify the identity of a subscriber. Such identity information may include, for example, a subscriber's social security number, place of birth, mother's maiden name, etc.

Of the tables shown in the FIG., tables 60-1 and 60-3 are indexed using a subscriber's account number. Table 60-3, more particularly, is formed from a plurality of customer-calling entries (CUS.LBL_1 through CUS.LBL_N), in which each such entry contains the ASCII versions of call labels, associated telephone numbers, associated label billing accounts and respective billing account numbers specified by a respective subscriber. Each such billing account number, in turn, points to an entry in billing-account table 60-2, in which the entry contains conventional billing information for the associated billing account number. Such billing information includes, for example, the name and address of the entity (or person) that is to be billed for an associated call, billing cycle (e.g., monthly or quarterly), etc.

Database 60 also includes table 60-5 which contains the eleven sets of digits that system 100 uses during the training phase of a subscription, as discussed above.

Figure 9:
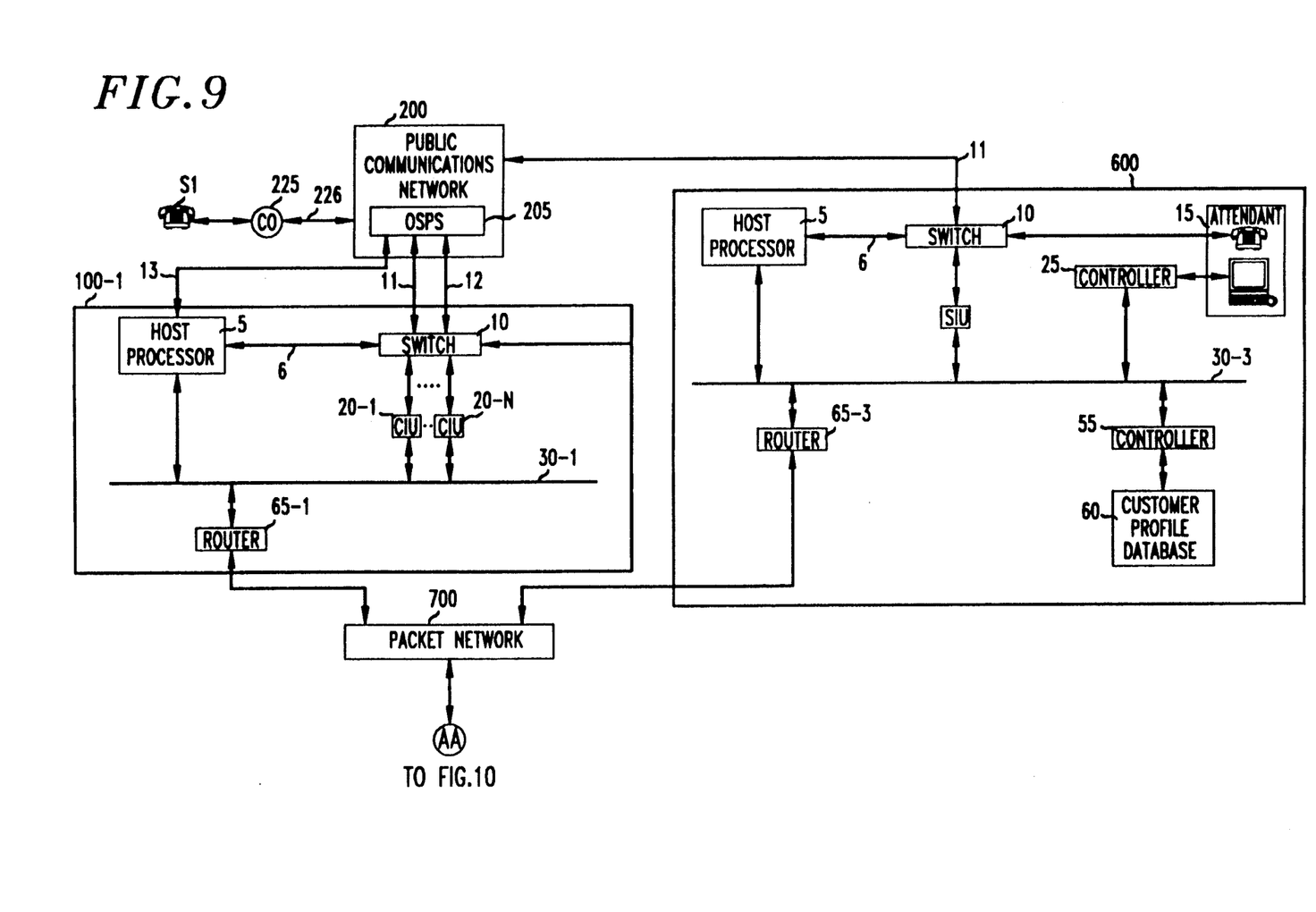
FIGS. 9 and 10 show a block diagram of an alterative embodiment of the communications system of FIG. 1.
Figure 10:
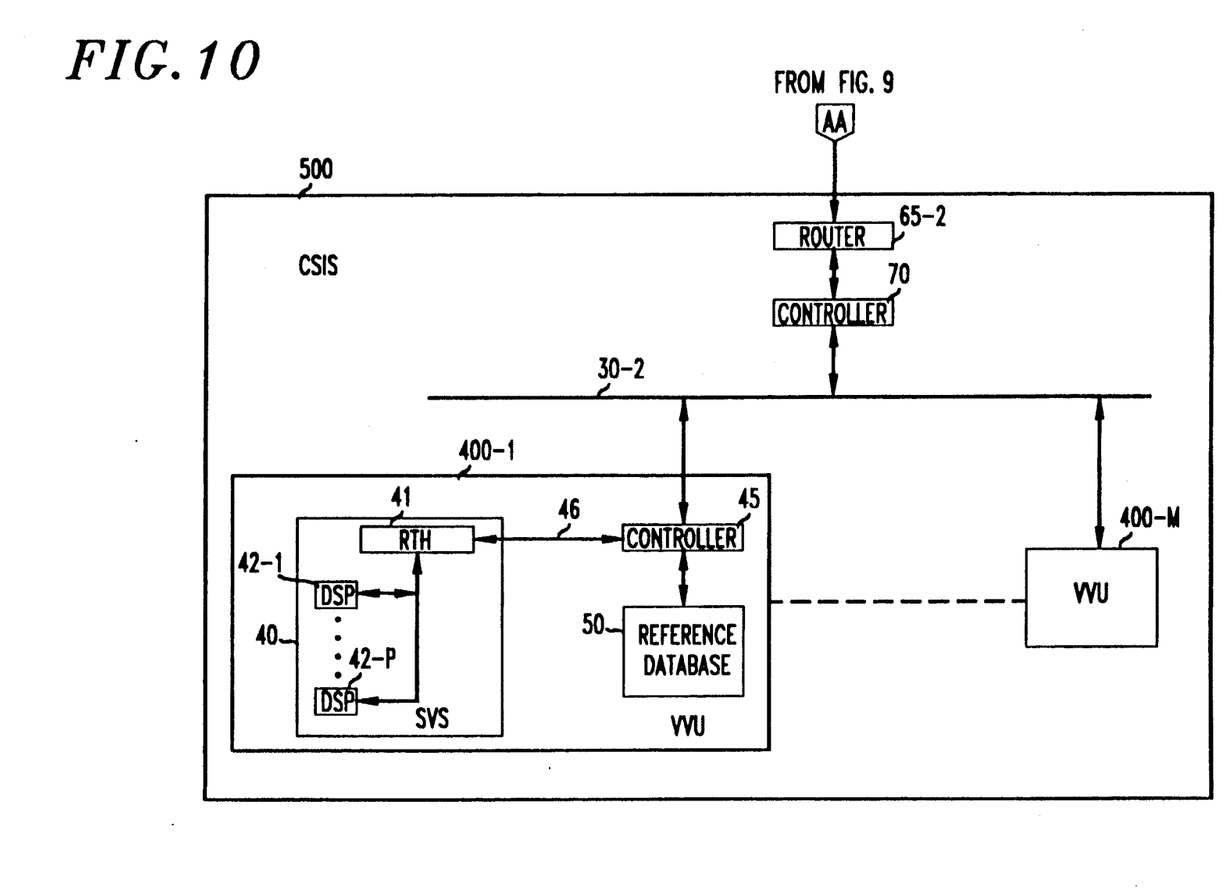
Figure 11:
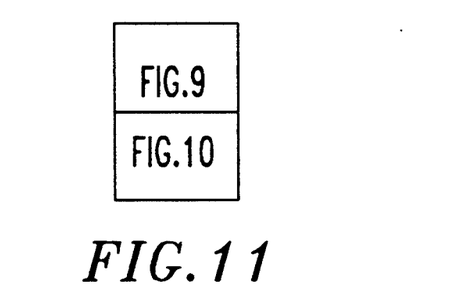
FIG. 11 shows the manner in which FIGS. 9 and 10 should be arranged with respect to one another.

Turning now to FIGS. 9 and 10, there is shown in block diagram form an alternative embodiment of the invention, one which centralizes the subscription and speaker verification functionalities performed by system 100 of FIG. 1 and which uses a high speed frame-relay packet network to interface such functionalities with one another. Advantageously, a smaller, "stripped down" version of voice directed system 100 may be associated with each network 200 Operator Service Position System, or OSPS, one of which is shown in the FIG., namely OSPS 205. In this way, a subscriber may readily access a Voice Directed Communications System Platform (VDCSP) 100-1 via an OSPS by dialing a telephone operator access code, for example, the digits "00". If a subscriber does so, for example, the subscriber associated with station set S1, then CO 225 in response to receipt of those digits extends the call to network 200, which, in turn, extends the call to one of its OSPSs, e.g., OSPS 205.

OSPS 205 in response to receipt of the call presents the caller with the option of selecting a telephone operator or the services provided by VDCSP 100-1. If the subscriber selects the latter option, then OSPS 205 extends the telephone connection carrying the call to switch 10 of VDCSP 100-1. In doing so, OSPS 205 supplies to host 5 via signaling circuit 13 the identity of the trunk that is being used to connect the call to switch 10. At that point, VDSCP 100-1 under the direction of host 5 processes the call in the manner discussed above in connection with FIG. 1.

It is seen from the FIG. that smaller VDCSP 100-1 still includes host processor 5, switch 10, CIUs 20-1 through 20-N and LAN 30 which operate in the manner discussed above. It is also includes router 65-1, which may be, for example, a conventional LAN/WAN type router available from Cisco Systems Inc, Menlo Park, Calif. Router 65-1, more particularly, provides an interface between its associated modified system 100 and high-speed packet network 700, which may be, for example, AT&T's InterSpan frame relay network. That is, router 65-1 removes from LAN 30-1 a message addressed to either Central Speaker Verification System, or CSVS, 500 or subscription system 600 and formats the message into a packet so that it conforms with the well-known frame relay protocol and supplies the packet to an associated network 700 node for delivery to the intended destination. (It is noted that Routers 65-2 and 65-3 perform a similar function.)

Similarly, if the intended destination happens to be CSVS 500, then router 65-2 (which may be similar to router 65-1) receives the packet from an associated packet network 700 node, changes the format of the received packet so that it conforms with the well-known TCP/IP message protocol, and supplies the message to its associated LAN 30-2 for delivery to controller 70. (In FIGS. 9 and 10, LANs 30-1, 30-2 and 30-3 may also be the well-known Ethernet network). Controller 70, in turn, supplies the message to one of its associated Voice Verification Units, or VVU, 400-1 through 400-M based on a predetermined selection scheme, for example, the subscriber identifier (account code) contained in the message. That is, VVUs 400-1 through 400-M are associated with respective ranges of subscriber identifiers, or account codes, e.g., 500,000 identifiers. Thus, subscriber records associated with a first range of identifiers are stored in reference database 50 of VVU 400-1. Subscriber records associated with a second range of identifiers are stored in reference database 50 of VVU 400-2, and so on.

Assuming that the identifier contained in the message is within the first range of identifiers, then controller 70 supplies the message to controller 45 of VVU 400-1. (It is noted that each VVU 400-1 through 400-M operates in the manner discussed above in connection with FIG. 1.) Assuming that the message is a speaker verification request, Then, as discussed above, controller 45 of VVU 400-1 (hereinafter controller 45) unloads from its associated reference database 50 the HMMs associated with the identifier contained in the message. Controller 45 then supplies the HMMs unloaded from database 50 and the speech models contained in the message and to associated RTH 41 for processing. Thereafter, controller 45 forms the results of such processing into a message addressed to the originator of the message received via network 700 and transmits the newly formed message over LAN 30-2. In addition, controller 45 unloads the voice templates of the calling and billing labels associated with received identifier from the associated reference database 50 and, in accord with an aspect of invention, inserts those templates in the formed message that it transmits over LAN 30-2. Controller 70, in turn, removes the message from LAN 30-2 and presents it to router 65-2. Similarly, router 65-2 reformats the message from the TCP/IP protocol to the frame relay protocol and supplies the reformatted packet message(s) to its associated network 700 node for delivery to VDCSP 100-1. Similarly, router 65-1 accepts the packet message from its associated network 700 node, reformats the message(s) so that it conforms with the TCP/IP protocol and supplies the results to LAN 30-1 for delivery to a particular one of the VDCSP 100-1 elements, e.g., CW 20-1. CIU 20-1, in turn, unloads the verifications results from the message and proceeds in the manner discussed above. CIU 20-1 also unloads the aforementioned templates and stores them in its local memory. Armed with those templates, CIU 20-1 may then process itself the associated calling subscriber's utterance of a calling label and/or billing label, thereby eliminating the need of having to perform that functionality in conjunction with CSVS 500 via network 700.

It is seen from the FIG. that the subscription section of system 100 (FIG. 1) discussed above, now forms subscription system 600. Subscription system 600, like system 100, includes attendant position 15 (representing a plurality of such positions), host 5, switch 10, SIU 21, controllers 25 and 55 and database 60 which cooperate with one another in the manner discussed above in connection with FIG. 1. Subscription system 600 still interacts with a controller 45 in the manner discussed above. However, such interaction is now via its associated router 65-3 and network 700.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. A voice directed telephone system employing automatic speech recognition apparatus, said system comprising:

means for storing in a memory for each of a plurality of subscribers an associated specification defining first and second groups of voice templates respectively characterizing calling and billing labels, said calling labels being associated with respective telephone numbers and said billing labels being associated with respective billing accounts, means, responsive to receipt of a telephone call from one of said subscribers, for prompting said one subscriber to utter a destination that said one subscriber desires to call, for receiving the subscriber's speech signals characterizing the desired destination as they are entered, for determining the telephone number of the desired called destination as a function of the received speech signals characterizing said destination and the associated first group of voice templates, for establishing a telephone call thereto and for charging for the cost of the established telephone call to a particular billing account associated with said one subscriber, and means, operative in the event that said one subscriber utters a label of the associated second group of labels prior to the establishment of said call, for identifying the associated one of said billing accounts as a function of the subscriber's speech signals identifying said uttered billing label and the associated second group of voice templates, and for then charging said call to said one billing account rather than to said particular billing account.

2. The system set forth in claim 1 wherein said means for storing further stores in said memory for each of said plurality of subscribers an associated identifier and a voice template characterizing the associated identifier, and wherein said means for prompting includes means for prompting said one subscriber to enter a subscriber identifier, for receiving speech signals characterizing said identifier as they are entered by said one subscriber and for verifying that said one subscriber is associated with the received identifier as a function of the received speech signals and the stored voice template characterizing the associated identifier.

3. The system set forth in claim 2 wherein the stored voice template associated with said one subscriber comprises particular models of said one subscriber's speech signals characterizing respective digits and wherein said subscriber identifier is a multidigit number formed from ones of said digits.

4. The system set forth in claim 2 wherein each said subscriber identifier is a multidigit number and wherein said specification further includes particular models of the associated subscriber's speech signals characterizing respective digits and wherein said means for receiving said identifier includes means, operative in the event that said one subscriber enters said identifier using signals other than speech signals but which characterize the digits of the associated identifier, for transmitting a series of random digits to said one subscriber and prompting said one subscriber to say each digit of the transmitted series, and for then verifying that said one subscriber is associated with the received identifier as a function of said one subscriber's speech signals characterizing respective digits of said series and the models of corresponding digits contained in the associated specification.

5. The system set forth in claim 2 wherein said identifier is associated with at least another one of said subscribers and wherein said means for determining includes means, operative in the event that the received speech signals characterizing said identifier do not compare with the voice template associated with said one subscriber, for then comparing those speech signals with the voice template associated with said other one of said subscribers.

6. The system set forth in claim 2 further comprising means, operative if said one subscriber is found to be associated with said identifier, for presenting to said one subscriber prior to establishing said call an indication as to the number of messages, if any, that are stored in an associated voice messaging service for said subscriber.

7. A communications system comprising:
   means for storing in a memory for each of a plurality of subscribers a specification of models of associated speech signals characterizing respective ones of predefined calling labels and predefined billing labels, said calling labels being associated with respective telephone numbers and said billing labels being associated with respective billing accounts,
   means, responsive to receipt of and answering a telephone call placed by one of said subscribers and responsive to the subsequent receipt of speech signals characterizing a calling label associated with said one subscriber, for identifying said received calling label as a function of said received speech signals and the associated stored speech models of said calling labels and for determining the associated telephone number as a function of the identified calling label, and
   means, responsive to the receipt of speech signals characterizing a billing label associated with said one subscriber, for identifying said received billing label as a function of the latter speech signals and the associated stored speech models of said billing labels, for placing a telephone call to the telephone number associated with the identified calling label, and for charging for the cost of said call to the billing account associated with the identified billing label.

8. The system set forth in claim 7 further comprising means, responsive to an absence of the receipt of speech signals characterizing said one billing label, for billing said cam to a default billing account.

9. The system set forth in claim 7 wherein each of the subscribers is associated with a unique identifier and wherein the associated specification includes models of the associated subscriber's speech signals characterizing the associated identifier, and wherein said system further comprises
   means, responsive to said call being answered, for prompting the caner to enter a subscriber identifier, and
   means, operative in the event that said caller says said identifier, for receiving the caller's speech signals and for comparing particular models of the received speech signals with corresponding ones of the speech models contained in the associated specification in order to verify that said caller is associated with the received identifier.

10. The system set forth in claim 9 wherein each said subscriber identifier is a respective multidigit number.

11. The system set forth in claim 9 wherein each said subscriber identifier is a respective multidigit number and wherein said means for receiving includes means, operative in the event that the caller enters signals other than speech signals but which characterize the digits of the associated identifier, for transmitting a series of random digits to said caller and prompting said caller to say each digit of the transmitted series, and for then verifying that said caller is said one subscriber as a function of the caller's speech signals characterizing respective digits of said series and the models of those digits contained in the associated specification.

12. The system set forth in claim 9 wherein said one subscriber identifier is also associated with at least another one of said subscribers and at least another specification, and wherein said other specification contains models of said other one of said subscriber's speech signals characterizing said identifier.

13. The system set forth in claim 12 wherein said means for comparing include means, operative in the event that said particular speech models do not compare with said corresponding models contained in said specification, for then comparing said particular speech models with corresponding ones of the speech models contained in the associated other specification in order to verify that said caller is associated with the received identifier.

14. The system set forth in claim 9 further comprising means, operative if said caller is found to be said one subscriber, for presenting to said caller prior to establishing said call an indication as to the number of messages, if any, that are addressed to said one subscriber and stored in an associated voice messaging service.

15. The system set forth in claim 9 wherein said identifier is a multidigit number and wherein said means for comparing includes a plurality of digital signal processors, and means for causing ones of said processors to process a model of said subscriber's speech signals characterizing a respective digit of said account code and the corresponding speech models contained in the associated specification.

16. The system set forth in claim 7 wherein said means for placing said call includes means, operative when said call has been established, for monitoring said call for particular signals and directing said call to an operator if the subscriber enters those signals.

17. The system set forth in claim 7 wherein said means for placing said call includes means, operative when said call has been established, for monitoring said call for particular signals, for terminating said call if the subscriber enters those signals and then prompting said caller to enter the identity of the next called destination.

18. A communications system comprising:
   means for receiving telephone calls from respective subscribers,
   means, responsive to receipt of a call, for requesting said caller to enter a destination that the caller desires to call,
   means, responsive to receipt of one of a number of different destination identifiers each identifying said destination for determining said destination as a function of the entered destination identifier and for establishing a telephone call thereto, in which the destination identifier may be (a) a speed dial code dialed by said caller, (b) a particular word characterized by speech signals, (c) multifrequency signals characterizing a telephone number indicative of said destination, or (d) speech signals characterizing said telephone number.

* * * * *